United States Patent [19]
Grudzien

[11] Patent Number: 6,029,525
[45] Date of Patent: Feb. 29, 2000

[54] CAPACITIVE BASED PRESSURE SENSOR DESIGN

[75] Inventor: Christopher P. Grudzien, Lowell, Mass.

[73] Assignee: MKS Instruments, Inc., Andover, Mass.

[21] Appl. No.: 09/018,395

[22] Filed: Feb. 4, 1998

[51] Int. Cl.[7] .................................................. G01L 9/12
[52] U.S. Cl. ............................................................. 73/718
[58] Field of Search .............................. 73/715, 718, 724, 73/706, 714; 361/283.1, 283.3

[56] References Cited

U.S. PATENT DOCUMENTS

| | | | |
|---|---|---|---|
| 3,318,153 | 5/1967 | Lode | 73/798 |
| 3,619,742 | 11/1971 | Rud, Jr. | 317/246 |
| 4,084,438 | 4/1978 | Lee et al. | 73/706 |
| 4,136,603 | 1/1979 | Doyle, Jr. | 92/98 R |
| 4,168,518 | 9/1979 | Lee | 361/283 |
| 4,358,814 | 11/1982 | Lee et al. | 361/283 |
| 4,434,203 | 2/1984 | Briefer | 428/152 |
| 4,735,090 | 4/1988 | Jeffrey et al. | 73/706 |
| 4,785,669 | 11/1988 | Benson et al. | 73/718 |
| 4,823,603 | 4/1989 | Ferran et al. | 73/724 |
| 4,977,480 | 12/1990 | Nishihara | 361/283 |
| 5,020,377 | 6/1991 | Park | 73/718 |
| 5,150,275 | 9/1992 | Lee et al. | 361/283 |
| 5,155,653 | 10/1992 | Kremidas | 361/283 |
| 5,279,163 | 1/1994 | D'Antonio et al. | 73/728 |
| 5,442,962 | 8/1995 | Lee | 73/718 |
| 5,499,533 | 3/1996 | Miller et al. | 73/152 |

FOREIGN PATENT DOCUMENTS 2188155  9/1987  United Kingdom .

OTHER PUBLICATIONS

Beynon, J.D.E. et al., "A Simple Micromanometer", Journal of Scientific Instruments, vol. 41, No. 2, Feb. 1964, pp. 111–112.

Cook, D.B. et al., "A Simple Diaphragm Micromanometer", Journal of Scientific Instruments, vol. 30, Jul. 1953, pp. 238–239.

Baratron® Absolute Pressure Transmitters 400 Series, ©1996 MKS Instruments, Inc., Andover, MA (No M.).

Baratron® General Purpose Absolute Pressure Transducers, 1993 MKS Instruments, Inc. (No. mo.).

*Primary Examiner*—William Oen
*Attorney, Agent, or Firm*—Hale and Dorr LLP

[57] ABSTRACT

The disclosed pressure transducer assembly includes a first body, a second body, a diaphragm, and an electrode. The first body induces a case, one or more spokes, and a hub. The case has an interior surface. Each of said spokes extends from a first end to a second end. The first end of each spoke contacts the interior surface and the second end of each spoke contacts the hub. The diaphragm is mounted between the first and second bodies. The first body and the diaphragm form a first chamber. The second body and the diaphragm form a second chamber. A portion of the diaphragm flexes in a first direction in response to pressure in the first chamber being greater than pressure in the second chamber. A portion of the diaphragm flexes in a second direction, opposite the first direction, in response to pressure in the second chamber being greater than pressure in the first chamber. The electrode is disposed in the first chamber and is fixed to the hub. A capacitance between the electrode and the diaphragm is representative of a difference between the pressures in the first and second chambers.

12 Claims, 9 Drawing Sheets

SECTION B-B

SECTION A-A

CAPACITIVE BASED PRESSURE SENSOR DESIGN

REFERENCE TO RELATED APPLICATIONS

The present invention is related to subject matter disclosed in copending U.S. patent application Ser. Nos. 08/748,820, entitled "Pressure Sensor", and 08/880,035, entitled "Capacitive Pressure Transducer With Improved Electrode Support", both of which were invented by John A. Denner. Both above referenced copending applications have been assigned to the assignee of the present invention.

BACKGROUND OF THE INVENTION

The present invention relates to capacitive pressure transducers. More specifically, the present invention relates to an improved electrode support for use with capacitive pressure transducers.

FIG. 1A shows a partially sectional side view of an assembled prior art capacitive pressure transducer assembly 100. FIG. 1B shows an exploded sectional side view of transducer assembly 100. For convenience of illustration, FIGS. 1A and 1B, as well as other figures in the present disclosure, are not drawn to scale. U.S. Pat. No. 4,823,603 discloses a capacitive pressure transducer assembly of the general form of transducer assembly 100. U.S. Pat. Nos. 5,020,377 and 4,785,669 also disclose capacitive pressure transducers relevant to the present disclosure.

Briefly, transducer assembly 100 includes a body that defines a first sealed interior chamber 110, and a second sealed interior chamber 112. Chambers 110 and 112 are isolated from one another by a relatively thin, flexible, conductive diaphragm 120. As will be discussed in greater detail below, diaphragm 120 is mounted so that it flexes, or deflects, in response to pressure differentials in chambers 110 and 112. Transducer assembly 100 provides a parameter that is indicative of the amount of diaphragm flexure and this parameter is therefore indirectly indicative of the differential pressure. The parameter provided by transducer assembly 100 indicative of the differential pressure is the electrical capacitance between diaphragm 120 and an electrode 130.

Transducer assembly 100 includes a P_x cover 140 and a P_x body 150 (as will be discussed below, the term "P_x" refers to an unknown pressure). FIG. 2A shows a top view of P_x body 150. P_x body 150 has a tubular shape and defines a central interior aperture 152 (shown in FIG. 2A and indicated by lines 153 in FIG. 1B). The upper surface of P_x body 150 is stepped and provides a shoulder 154 that extends around the perimeter of aperture 152. P_x body 150 also includes a lower surface 156. P_x cover 140 is a circular metallic sheet and is provided with a pressure tube 142 that defines a central aperture 144. P_x cover 140 is rigidly affixed to the lower surface 156 of P_x body 150 (e.g., by welding). Diaphragm 120 is normally a thin, circular, flexible sheet of conductive material (e.g., stainless steel). As stated above, FIGS. 1A and 1B are not drawn to scale, and diaphragm 120 is normally much thinner than illustrated in comparison to the other components of transducer assembly 100. Diaphragm 120 contacts shoulder 154 of P_x body 150 as indicated in FIG. 1A. The outer perimeter of diaphragm 120 is normally welded to P_x body 150 to rigidly hold the outer perimeter of diaphragm 120 to shoulder 154 of P_x body 150.

P_x cover 140, P_x body 150, and diaphragm 120 cooperate to define interior sealed chamber 110. P_x cover 140 defines the bottom, P_x body 150 defines the sidewalls, and diaphragm 120 defines the top of chamber 110. Fluid in tube 142 may flow through aperture 144, and through central aperture 152 (shown in FIG. 2A) into chamber 110. So, fluid in tube 142 is in fluid communication with the lower surface of diaphragm 120.

Transducer assembly 100 also includes a P_r body 160 and a P_r cover 170 (as will be discussed below, the term "P_r" refers to a reference pressure). FIG. 2B shows a top view of P_r body 160. P_r body 160 has a tubular shape and defines a central aperture 162 (shown in FIG. 2B and indicated by lines 263 in FIG. 1B).

The upper surface of P_r body 160 is stepped and provides a lower shoulder 164 and an upper shoulder 166. Lower shoulder 164 extends around the perimeter of aperture 162, and upper shoulder 166 extends around the perimeter of lower shoulder 164. P_r body 160 also includes a lower surface 168 opposite to shoulders 164, 166. Lower surface 168 of P_r body 160 is rigidly affixed to the upper surface of the outer perimeter of diaphragm 120 (e.g., by welding). P_r cover 170 is a circular metallic sheet and is provided with a pressure tube 172 which defines a central aperture 174. P_r cover 170 is rigidly affixed to P_r body 160 (e.g., by welding) so that the outer perimeter of P_r cover 170 is in contact with upper shoulder 166 of P_r body 160.

P_r cover 170, P_r body 160, and diaphragm 120 cooperate to define interior sealed chamber 112. Diaphragm 120 defines the bottom, P_r body 160 defines the sidewalls, and P_r cover 170 defines the top of chamber 112. Fluid in tube 172 may flow through aperture 174, and through central aperture 162 (shown in FIG. 2B) into chamber 112. So, fluid in tube 172 is in fluid communication with the upper surface of diaphragm 120. As will be discussed below, electrode 130 is housed in, and does not interfere with the fluid flow in, chamber 112.

Electrode 130 is normally fabricated from a non-conducting (or insulating) ceramic block and has a cylindrical shape. FIG. 2C shows a bottom view of electrode 130. The lower surface of electrode 130 is stepped and includes a central face 135 and a shoulder 136 that extends around the outer perimeter of central face 135. Electrode 130 also defines an aperture 132 (shown in FIG. 2C and indicated by lines 133 in FIG. 1B). Electrode 130 further includes a relatively thin conductor 134 that is deposited (e.g., by electroplating) onto central face 135. Conductor 134 is explicitly shown in FIGS. 1B and 2C, and for convenience of illustration, conductor 134 is not shown in FIG. 1A. Electrode 130 is damped between P_r cover 170 and lower shoulder 164 of P_r body 160 as shown in FIG. 1A. Aperture 132 (shown in FIG. 2C) in electrode 130 permits fluid to freely flow through electrode 130 between the upper surface of diaphragm 120 and pressure tube 172. Clamping electrode 130 to P_r body 160 holds conductor 134 in spaced relation to diaphragm 120. Electrode 130 is normally positioned so that the space between conductor 134 and diaphragm 120 is relatively small (e.g., on the order of 0.0002 meters).

Conductor 134 and diaphragm 120 form parallel plates of a capacitor 138. As is well known, $C=Ae/d$, where C is the capacitance between two parallel plates, A is the common area between the plates, e is a constant based on the material between the plates (e=1 for vacuum), and d is the distance between the plates. So, the capacitance provided by capacitor 138 is a function of the distance between diaphragm 120 and conductor 134. As diaphragm 120 flexes up and down, in response to changes in the pressure differential between chambers 110 and 112, the capacitance provided by capacitor 138 also changes. At any instant in time, the capacitance provided by capacitor 138 is indicative of the instantaneous differential pressure between chambers 110 and 112. Known electrical circuits (e.g., a "tank" circuit characterized by a resonant frequency that is a function of the capacitance provided by capacitor 138) may be used to measure the capacitance provided by capacitor 138 and to provide an electrical signal representative of the differential pressure.

Transducer assembly 100 includes an electrically conductive feedthrough 180 to permit measurement of the capacitance provided by capacitor 138. One end 182 of feedthrough 180 contacts electrode 130. Feedthrough 180 extends through an aperture in P__r cover 170 so that the other end 184 of feedthrough 180 is external to transducer assembly 100. The aperture in P__r cover 170 through which feedthrough 180 extends is sealed, for example by a melted glass plug 185, to maintain the pressure in chamber 112 and to electrically insulate feedthrough 180 from P__r cover 170.

Feedthrough 180 is electrically connected to conductor 134. Electrode 130 normally includes an electroplated through hole (not shown) to permit electrical connection between conductor 134 (on the bottom surface of electrode 130) and end 182 of feedthrough 180 which contacts the top surface of electrode 130. So, feedthrough 180 provides electrical connection to one plate of capacitor 138 (i.e., conductor 134). Since diaphragm 120 is welded to P__r body 160, P__r body 160 provides electrical connection to the other plate of capacitor 138 (i.e., diaphragm 120). So, the capacitance provided by capacitor 138 may be measured by electrically connecting a measuring circuit (not shown) between P__r body 160 and end 184 of feedthrough 180. In practice, the body of transducer assembly 100 is normally grounded, so the capacitance provided by capacitor 138 may be measured simply by electrically connecting the measuring circuit to end 184 of feedthrough 180.

Conductor 134 is normally disposed in a circular "ring-like" configuration on the lower surface of electrode 130 (as indicated in FIG. 2C). Further, some prior art pressure transducers include more than one conductor disposed on electrode 130 and a corresponding number of feedthroughs to electrically connect to the conductors. Such transducers provide at least two capacitors: a first capacitor formed by diaphragm 120 and one conductor on electrode 130 and a second capacitor formed by diaphragm 120 and another conductor on electrode 130. As is known, providing multiple capacitors in this fashion can be used to advantageously provide more accurate temperature compensation for the transducer.

In operation, transducer assembly 100 is normally used as an absolute pressure transducer. In this form, chamber 112 is normally first evacuated by applying a vacuum pump (not shown) to pressure tube 172. After chamber 112 has been evacuated, tube 172 is then sealed, or "pinched off" to maintain the vacuum in chamber 112. This creates a "reference" pressure in chamber 112. Although a vacuum is a convenient reference pressure, it is also known to use other pressures as the reference pressure. Since the pressure in chamber 112 is a known or reference pressure, the components used to construct chamber 112 (i.e., P__r body 160 and P__r cover 170) are referred to as P__r components (i.e., "reference pressure" components). After the reference pressure has been established in chamber 112, pressure tube 142 is then connected to a source of fluid (not shown) to permit measurement of the pressure of that fluid. Coupling pressure tube 142 in this fashion delivers the fluid, the pressure of which is to be measured, to chamber 110 (and to the lower surface of diaphragm 120). Since the pressure in chamber 110 is unknown, or is to be measured, the components used to construct chamber 110 (i.e., P__x cover 140 and P__x body 150) are referred to as P__x components (i.e., "unknown pressure" components). The center of diaphragm 120 flexes up or down in response to the differential pressure between chambers 110 and 112. Transducer assembly 100 permits measurement of the amount of flexure of the diaphragm and thereby permits measurement of the pressure in chamber 110 relative to the known pressure in chamber 112.

Transducer assembly 100 can of course also be used as a differential pressure transducer. In this form, pressure tube 142 is connected to a first source of fluid (not shown) and pressure tube 172 is connected to a second source of fluid (not shown). Transducer assembly 100 then permits measurement of the difference between the pressures of the two fluids.

One problem with transducer assembly 100 relates to the zero pressure differential starting space between conductor 134 and diaphragm 120. In operation of transducer assembly 100, diaphragm 120 of course flexes up and down thereby changing the spacing between diaphragm 120 and conductor 134. However, for transducer assembly 100 to provide a consistently accurate pressure reading, it is important to provide a constant starting nominal spacing between diaphragm 120 and conductor 134. So for a particular pressure differential, for example the zero pressure differential, it is important to insure that the starting distance between diaphragm 120 and conductor 134 is always the same. The starting distance between diaphragm 120 and conductor 134 for a particular pressure differential between chambers 110 and 112 may be referred to as the "nominal distance". When manufacturing large numbers of transducer assemblies 100, it is important to consistently provide the same nominal distance between conductor 134 and diaphragm 120. Further, in any one unit of transducer assembly 100, it is important to insure that the nominal distance remains constant and does not vary over time.

Prior art transducer assembly 100 includes a resilient element 192 for maintaining a constant nominal distance. Resilient element 192 is squeezed between P__r cover 170 and the top of electrode 130. Lower shoulder 164 of P__r body 160 supports shoulder 136 of electrode 130. Since P__r cover 170 is welded to P__r body 160, resilient element 192 provides a spring force that pushes down on electrode 130 and holds electrode 130 in a fixed position relative to P__r body 160. Resilient element 192 is often implemented using a "wave washer" (i.e., a metallic 0-ring type washer that has been bent in one or more places in directions perpendicular to the plane of the ring). Resilient element 192 provides a relatively large spring force (e.g., on the order of one hundred pounds) so as to hold electrode 130 in a stable position.

Although transducer assembly 100 holds electrode 130 securely, the nominal distance between conductor 134 and diaphragm 120 can vary by small amounts over time in response to, for example, mechanical or thermal shock. As those skilled in the art will appreciate, elements that are held in place by compression, such as electrode 130, can exhibit small amounts of movement (sometimes referred to as "creep") over time. This creep can sometimes change the nominal distance and thereby adversely affect the accuracy of transducer assembly 100. Overpressure conditions can also cause unwanted movement of electrode 130. During normal operation of transducer assembly 100, diaphragm 120 will never contact electrode 130. However, large pressures in chamber 110 beyond the normal operating range of transducer assembly 100 (i.e., overpressure), can cause diaphragm 120 to contact electrode 130 and slightly compress resilient element 192. When the overpressure condition dissipates and diaphragm 120 returns to a normal operating position, resilient element 192 re-expands and reseats electrode 130. Sometimes the new position of electrode 130 will be slightly different than the original position prior to the overpressure condition. Such changes in position can cause shifts in the nominal distance and adversely affect the accuracy of transducer assembly 100.

It is therefore an object of the present invention to provide a pressure transducer assembly with an improved mounting for the electrode.

SUMMARY OF THE INVENTION

The invention provides an improved mounting for an electrode in a pressure transducer. The mounting provides improved stability for the electrode.

In one aspect, the invention provides an improved pressure transducer assembly. The assembly includes a first body, a second body, a diaphragm, and an electrode. The first body includes a case, one or more spokes, and a hub. The case has an interior surface. Each of said spokes extends from a first end to a second end.

The first end of each spoke contacts the interior surface and the second end of each spoke contacts the hub. The diaphragm is mounted between the first and second bodies. The first body and the diaphragm form a first chamber. The second body and the diaphragm form a second chamber. A portion of the diaphragm flexes in a first direction in response to pressure in the first chamber being greater than pressure in the second chamber. A portion of the diaphragm flexes in a second direction, opposite the first direction, in response to pressure in the second chamber being greater than pressure in the first chamber. The electrode is disposed in the first chamber and is fixed to the hub. A capacitance between the electrode and the diaphragm is representative of a difference between the pressures in the first and second chambers.

Still other objects and advantages of the present invention will become readily apparent to those skilled in the art from the following detailed description wherein the invention is shown and described, simply by way of illustration of the best mode of the invention. As will be realized, the invention is capable of other and different embodiments, and its several details are capable of modifications in various respects, all without departing from the invention. Accordingly, the drawings and description are to be regarded as illustrative in nature, and not in a restrictive or limiting sense, with the scope of the application being indicated in the claims.

BRIEF DESCRIPTION OF THE FIGURES

For a fuller understanding of the nature and objects of the present invention, reference should be made to the following detailed description taken in connection with the accompanying drawings in which the same reference numerals are used to indicate the same or similar parts wherein.

DETAILED DESCRIPTION OF THE PREFERRED EMBODIMENTS

Figure 3B:
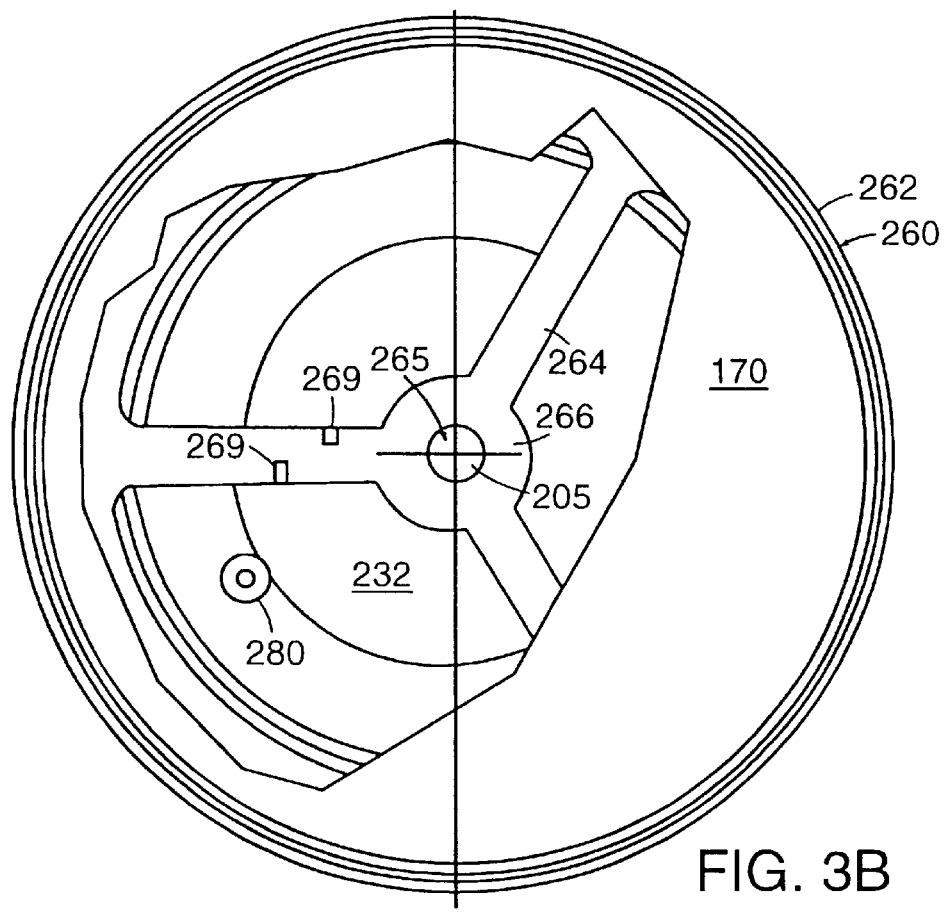
FIG. 3B shows a partially broken away top view of the assembly shown in FIG. 3A.
Figure 3A:
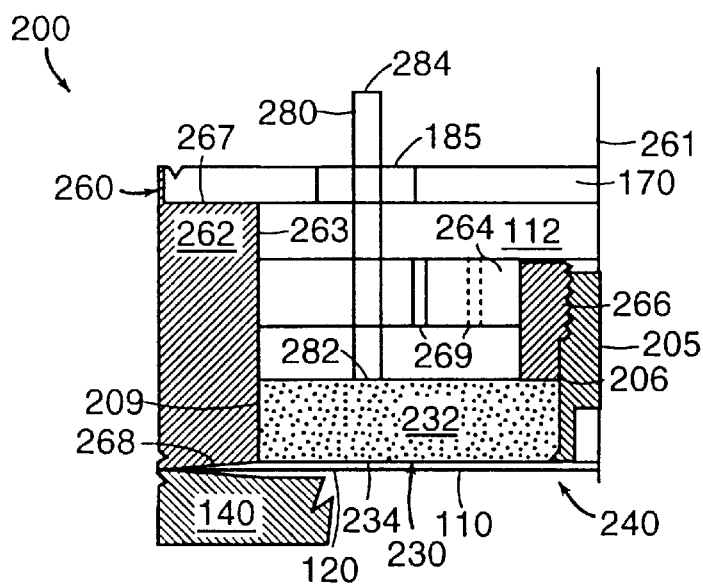
FIG. 3A shows a partially sectional side view of a capacitive pressure transducer assembly constructed according to the present invention.

FIG. 3A shows a partially sectional side view of an assembled transducer assembly 200 constructed according to the present invention. FIG. 3B shows a partially broken away top view of the transducer assembly shown in FIG. 3A.

Figure 3C:
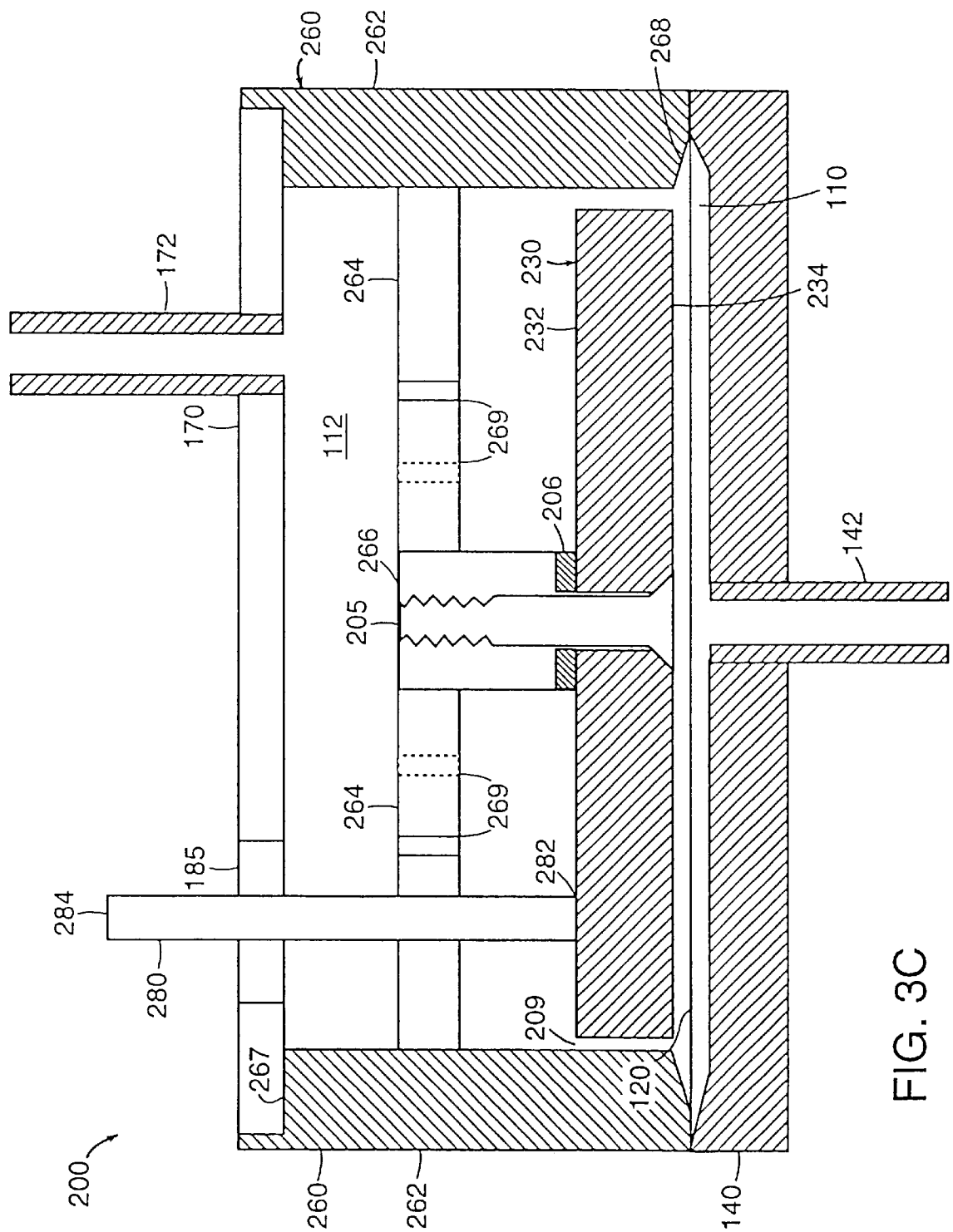
FIG. 3C shows a sectional side view of a capacitive pressure transducer constructed according to the present invention.

FIG. 3C shows a sectional side view of transducer assembly 200. In the preferred embodiment, some components used to construct transducer assembly 200 are the same, or similar to, components used in prior art transducer assembly 100. More specifically, transducer assembly 200 includes P__x cover 140, diaphragm 120, and P__r cover 170 components that are similar to those used in prior art transducer assembly 100. However, rather than the P__r body 160 and electrode 130 components used in prior art assembly 100, assembly 200 includes an improved P__r body 260 and an improved electrode 230. Assembly 200 eliminates the need for resilient element 192.

Figure 4B:
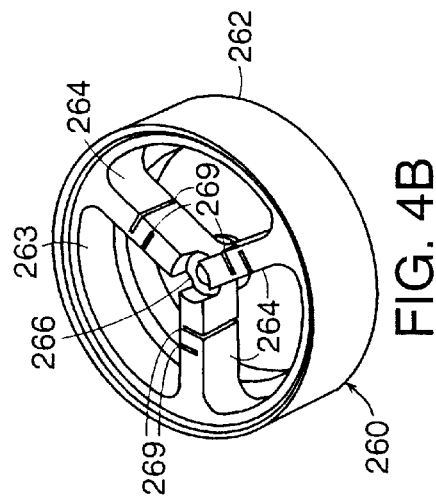
FIGS. 4A and 4B show top and perspective views, respectively, of a preferred embodiment of the improved P__r body used in the assembly shown in FIGS. 3A–3C.
Figure 4C:
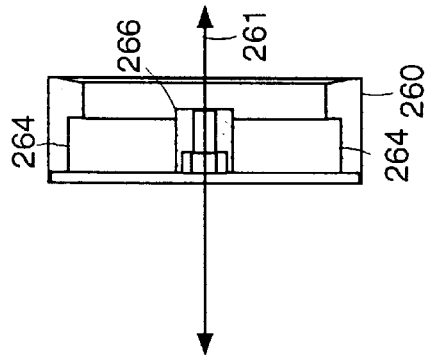
FIGS. 4C and 4D show sectional views of the P__r body shown in FIG. 4A taken along lines 4C—4C and 4D—4D, respectively, as shown in FIG. 4A.
Figure 4D:
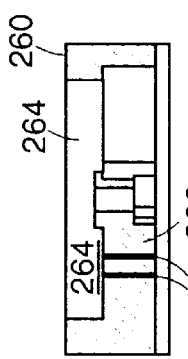
Figure 4A:
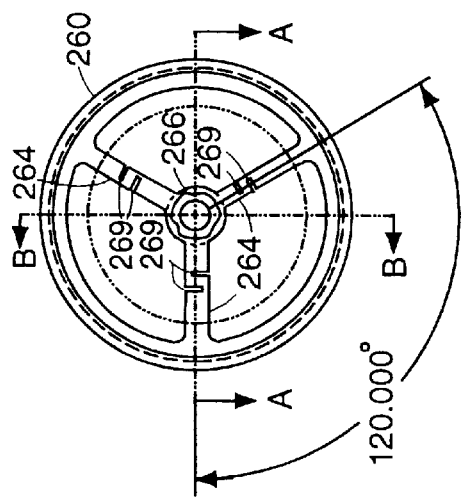

FIGS. 4A and 4B show top and perspective views, respectively, of a preferred embodiment of improved P__r body 260. FIG. 4C shows a sectional view of P__r body 260 taken along line 4C—4C as shown in FIG. 4A, and FIG. 4D shows a sectional view of P__r body 260 taken along line 4D—4D as shown in FIG. 4A. As shown in FIGS. 4A—4D, P__r body 260 includes an outer tubular case or shell 262, one or more spokes 264, and a central hub 266. Tubular case 262 extends along a central axis 261 as shown in FIGS. 4C and 4D. Case 262 includes an interior surface 263 which defines an interior cavity or aperture within P__r body 260. In preferred embodiments, spokes 264 extend from interior surface 263 in a direction substantially perpendicular to axis 261 towards the center of case 262. In other embodiments spokes 264 can extend from interior surface 263 in directions other than perpendicular to axis 261 towards the center of case 262. Spokes 264 support central hub 266, and central axis 261 intersects central hub 266. One end of each spoke 264 contacts the interior surface 263 of case 262, and the other end of each spoke 264 contacts and supports central hub 266. As will be discussed in greater detail below, one advantage of P_r body 260 is that central hub 266 tends to remain substantially stationary, or motionless, with respect to case 262.

Referring again to FIGS. 3A–3C, it can be seen that the upper surface of case 262 is preferably stepped and defines a shoulder 267 for supporting P_r cover 170. In the preferred embodiment, P_r cover 170 is welded to shoulder 267 to form an airtight seal between P_r cover 170 and the top of case 262. Case 262 also defines a lower surface 268. In the preferred embodiment, diaphragm 120 is welded to lower surface 268 to form an air-tight seal between diaphragm 120 and the bottom of case 262. P_r cover 170, P_r body 260, and diaphragm 120 thereby cooperate to define interior sealed chamber 112 (as in prior art assembly 100, pressure tube 172 can be sealed to provide a desired reference pressure in chamber 112).

Figure 1A:
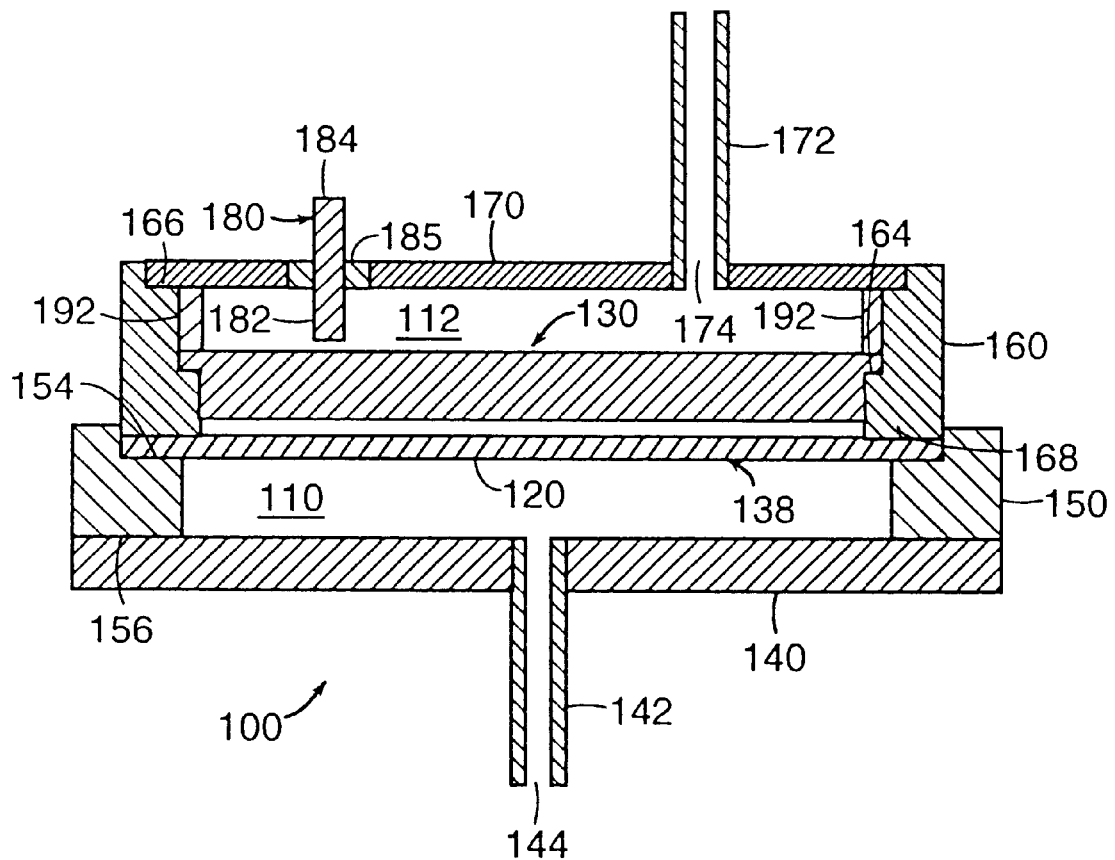
FIG. 1A shows a partially sectional side view of a prior art assembled transducer assembly.
Figure 1B:
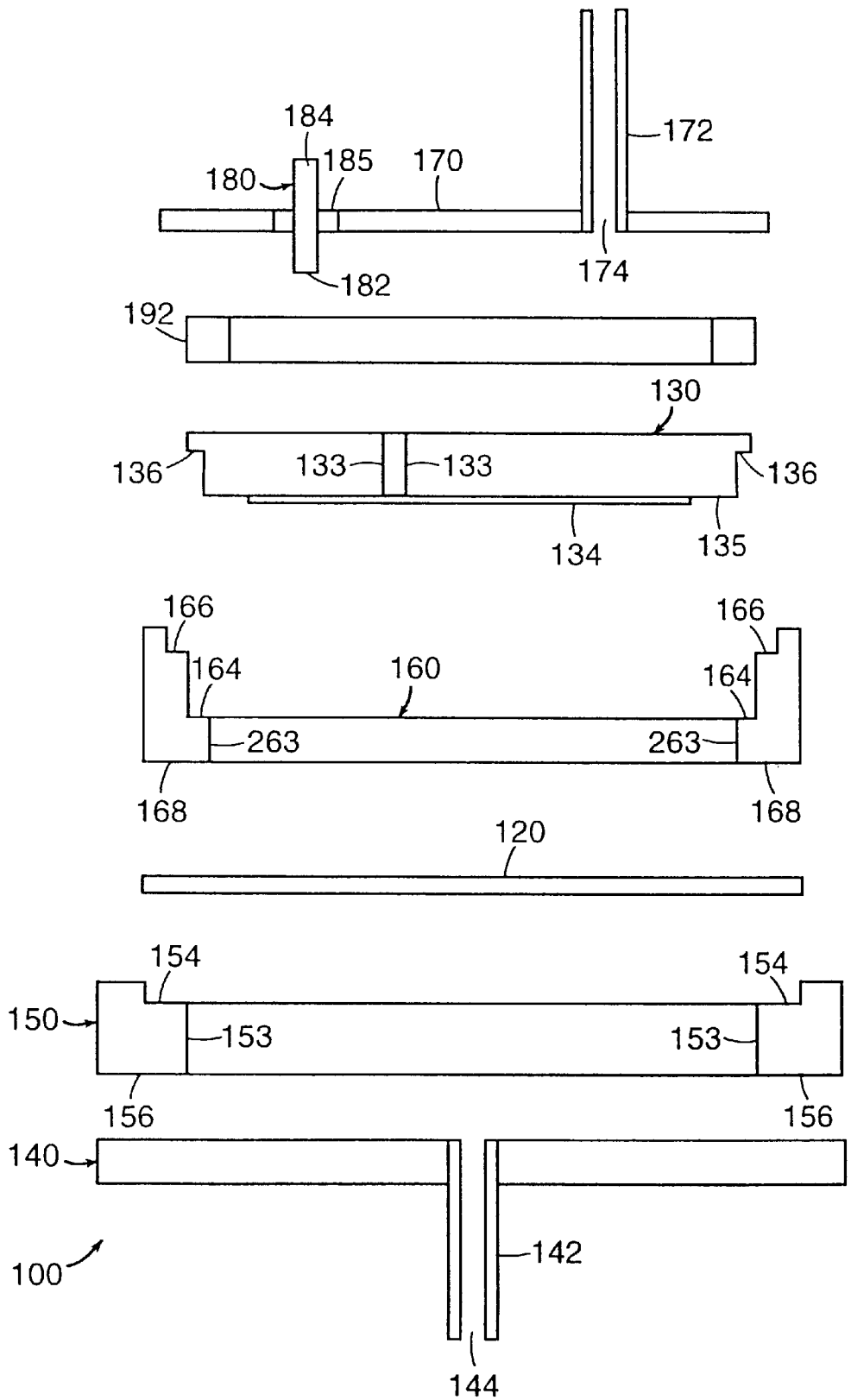
FIG. 1B shows an exploded sectional side view of the assembly shown in FIG. 1A.

An upper surface of P_x body 140 is preferably fixed (e.g., welded) to diaphragm 120 so that P_x body 140 and diaphragm 120 cooperate to define interior chamber 110 (on the opposite side of diaphragm 120 from chamber 112). Although FIGS. 1A and 1B show the chamber 110 as being formed by P_x cover 140, P_x body 150, and diaphragm 120, assembly 200 eliminates the need for, and forms chamber 110 without, P_x body 150. In other embodiments, assembly 200 can include P_x body 150 and can form chamber 110 in the same or similar fashion as illustrated in FIGS. 1A and 1B. However, in the preferred embodiment of assembly 200, P_x body 150 is eliminated. Those skilled in the art will appreciate that the P_x cover 140 shown in FIG. 3A is similar to, but not exactly the same as, the P_x cover 140 shown in FIG. 1A. More specifically, the upper surface of the P_x cover 140 shown in FIG. 3A is sloped, or beveled (rather than flat as shown in FIG. 1A), so that chamber 110 is formed between the P_x cover 140 and diaphragm 120 when the diaphragm 120 is fixed (e.g., welded) to the outer perimeter of the upper surface of P_x cover 140. Those skilled in the art will appreciate that the differences between the P_x covers 140 illustrated in FIGS. 1A and 3A, as well as the manner in which chamber 110 is formed, are not critical to the present invention.

Figure 5A:
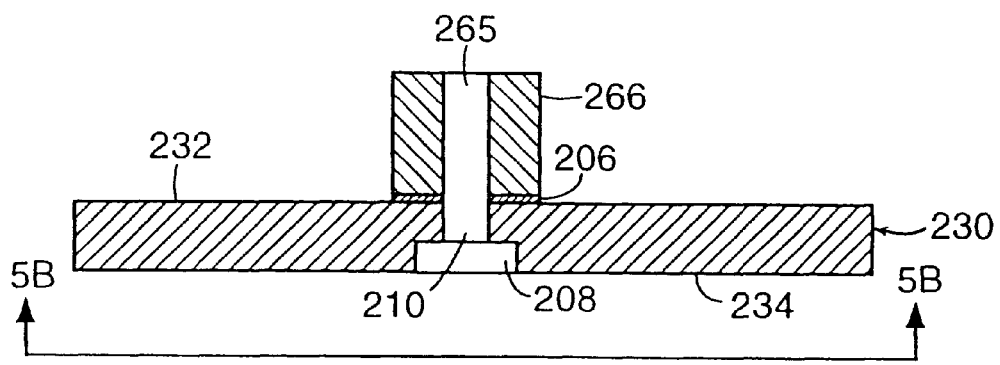
FIGS. 5A and 5B show sectional side and bottom views, respectively, of a preferred embodiment of the electrode shown in FIGS. 3A–3B.
Figure 5B:
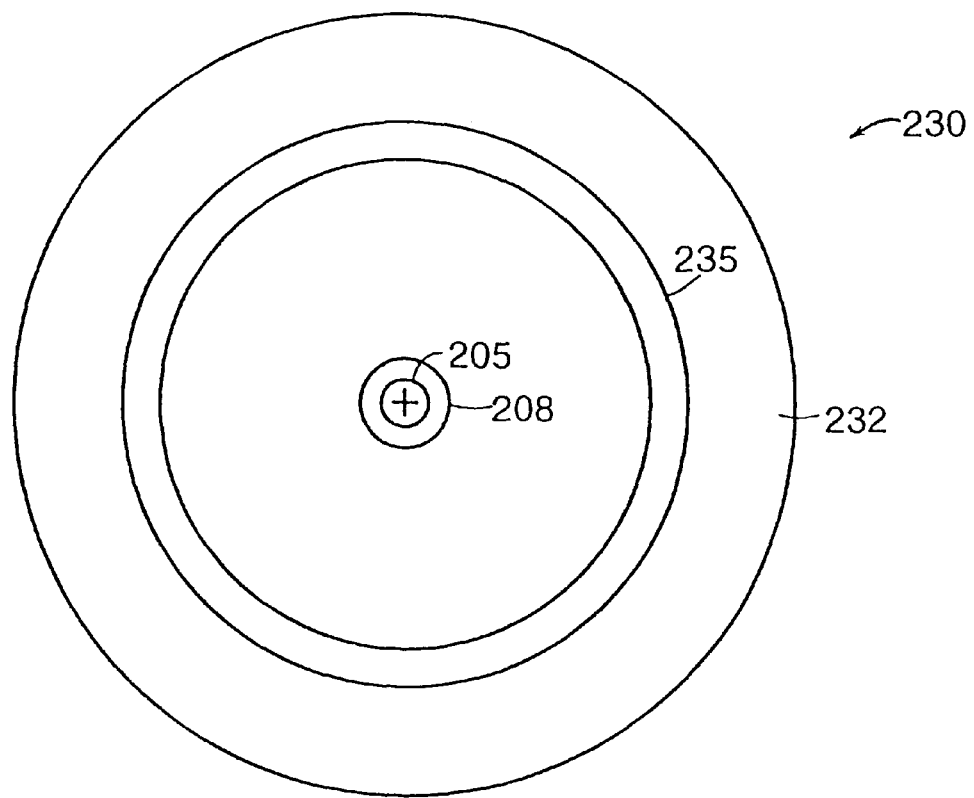

Central hub 266 defines a central aperture 265 (shown in FIG. 3B), which is preferably configured (e.g., threaded) to receive a screw 205 or other type of fastener. Screw 205 or other fastener holds electrode 230 to central hub 266 of the P_r body 260. FIG. 5A shows a sectional side view of a preferred embodiment of electrode 230 mounted to central hub 266. FIG. 5B shows a view of electrode 230 taken along line 5B—5B of FIG. 5A. Electrode 230 includes a block 232 of electrically insulative material (preferably ceramic), which may for example be cylindrical or disc shaped, and a conductor 235 (shown in FIG. 5B) disposed in conventional fashion on the lower surface 234 of block 232. In this embodiment, insulative block 232 defines a central aperture 210 configured to match the central aperture 265 of central hub 266.

As shown in FIGS. 3A and 3C, screw 205 holds hub 266 and insulative block 232 together. Insulative block 232 also preferably defines a depression 208 (as shown in FIG. 5A) that is wider than, and that connects to, bore hole 210 to permit counter sinking of screw 205. It is desirable to provide for countersinking of screw 205 in this manner to prevent any portion of screw 205 from entering the space between electrical conductor 234 and diaphragm 120. In other embodiments, a rivet or adhesive may be used in place of screw 205. In yet another embodiment, one end of screw (or bolt) 205 extends through aperture 265 and a nut (not shown) is threaded onto that end and cooperates with screw 205 to hold hub 266 and insulative block 232 together. In this embodiment, central aperture 265 may or may not be threaded.

When electrode 230 is fixed to central hub 266 (e.g., by screw 205), the lower surface 234 of insulator 232 is placed in spaced relation to the diaphragm 120 (as shown in FIGS. 3A and 3C) so that diaphragm 120 and the conductor 235 (shown in FIG. 5B) form one or more capacitors 240. One or more spacers 206 may be disposed between the top of insulative block 232 and the bottom of central hub 266 to adjust the spacing between the conductor 235 and the diaphragm 120. The spacers 206 are preferably configured as "ring" type washers defining a central aperture to permit passage of screw 205. In preferred embodiments, spacers 206 are between 0.004 and 0.007 inches thick, are made from stainless steel and are used in quantities of two or less.

The conductor 235 may be disposed as a relatively thin ring as shown in FIG. 5B. Alternatively, one or more other types of conductors may be disposed on the lower surface 234 of insulative block 232 so that the capacitor 240 formed by each conductor and diaphragm 120 is indicative of the distance between diaphragm 120 and the conductor.

In preferred embodiments of transducer assembly 200, insulative block 232 is mounted by fixing only a central portion of insulative block 232 to hub 266. The outer perimeter of insulative block 232 spaced apart from, and is not in contact with, case 262 of P_r body 260 so that a gap 209 (as shown in FIGS. 3A and 3C) is provided between case 262 and insulative block 232. This stands in contrast with prior art transducer assembly 100 wherein the entire outer perimeter of ceramic electrode 130 was supported by P_r body (and resilient element 192). As will be discussed in greater detail below, this improves the stability of electrode 230.

Figure 2A:
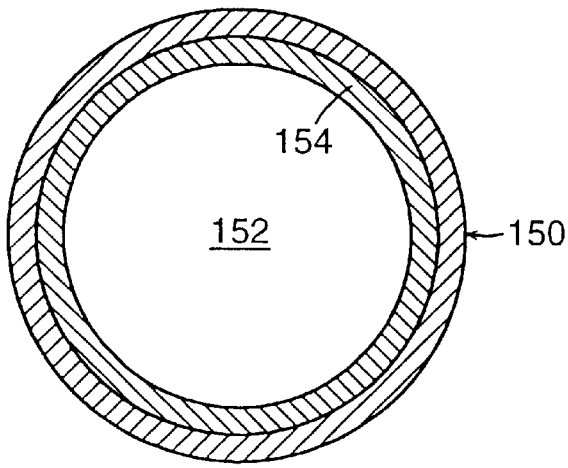
FIG. 2A shows a top view of the P__x body shown in FIGS. 1A–1B.
Figure 2C:
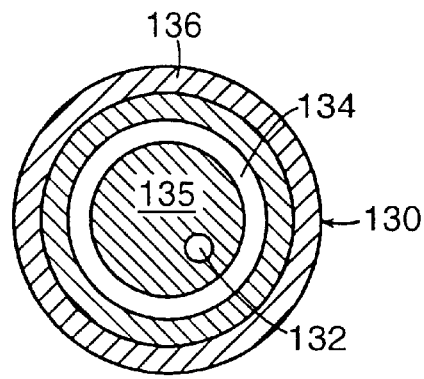
FIG. 2C shows a bottom view of the electrode shown in FIGS. 1A–1B.
Figure 2B:
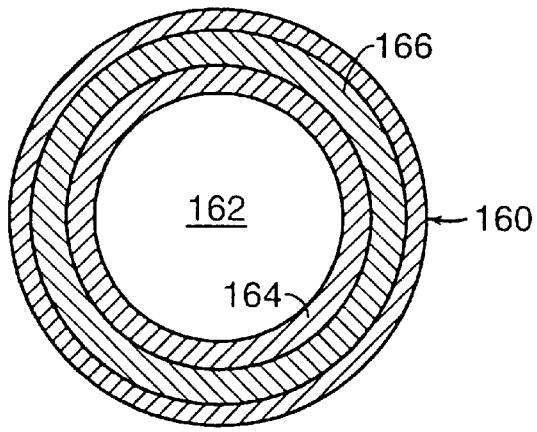
FIG. 2B shows a top view of the P__r body shown in FIGS. 1A–1B.

Spokes 264, central hub 266, and electrode 230 are all disposed in interior chamber 112. However, these components do not interfere with the communication of fluid pressure between diaphragm 120 and P_r cover 170. As stated above, electrode 230 is mounted to central hub 266 and gap 209 (shown in FIG. 3C) is provided between case 262 and electrode 230. Gap 209 permits fluid to flow around electrode 230 and thereby eliminates the need for aperture 132 (shown in FIG. 2C) of prior art electrode 130. Electrode 230 is therefore simpler and less expensive to construct than prior art electrode 130. Spokes 264 also do not interfere with fluid flow within chamber 112 since large apertures exist between adjacent spokes (i.e., since a discrete number of spokes, rather than a continuous circular planar sheet, are used to support central hub 266, the support for central hub 266 does not interfere with fluid flow within chamber 112).

Transducer assembly 200 includes an electrically conductive feedthrough 280 for electrically connecting to conductor 235. One end 282 of feedthrough 280 contacts the upper surface of insulative block 232. Feedthrough 280 extends through the space between the spokes (as shown in FIG. 3B) and through an aperture in P_r cover 170. The other end 284 of feedthrough 280 is external to transducer assembly 200. As with prior art transducer assembly 100, the aperture in P_r cover 170 through which feedthrough 280 extends is sealed (e.g., with glass plug 185) to maintain pressure in chamber 112 and to electrically insulate feedthrough 280 from P_r cover 170. The lower end 282 of feedthrough 280 is electrically connected in conventional fashion to conductor 235 (e.g., through an electroplated aperture extending through or around the edge of insulative block 232 from end 282 to conductor 235). Feedthrough 280 is electrically connected to one plate (i.e., conductor 234) of capacitor 240, and P__r body 260 is electrically connected to the other plate (i.e., diaphragm 120) of capacitor 240. Feedthrough 280 preferably contacts electrode 230 without providing structural support to electrode 230. Rather, the structural support for electrode 230 is provided by central hub 266 of the P__r body 260.

As stated above, one advantage of P__r body 260 is that central hub 266 tends to remain substantially stationary, or motionless, with respect to case 262. That is, spokes 264 provide a stable mounting for central hub 266. Since central hub 266 remains substantially stationary, or motionless, with respect to case 262, electrode 230 remains substantially stationary with respect to a nominal position of diaphragm 120. Assembly 200 thereby advantageously provides a substantially constant nominal distance between electrode 230 and diaphragm 120.

One reason that central hub 266 remains substantially stationary with respect to case 262 relates to the elimination, or reduction, of spring forces in assembly 200. As stated above, prior art transducer assembly 100 used the spring force resulting from compressing resilient element 192 to maintain the position of electrode 130. The electrode 130 of prior art assembly 100 was therefore subject to "creep" or motion over time. Rather than such resilient elements, improved transducer assembly 200 uses spokes 264 to fix the position of central hub 266 so that hub 266 forms a stable mounting platform. Assembly 200 then uses a fastener such as screw 205 (or a rivet, or an adhesive, or a welded bond, or other type of fastener) to securely hold electrode 230 to the stable mounting platform of central hub 266. Electrode 230 remains stationary because of the stable, stationary, nature of central hub 266.

Spokes 266 are preferably formed from solid members. In a nominal state (e.g., at a nominal operating temperature of assembly 200) spokes 266 are preferably not under any tension or compression. Whereas prior art assembly 100 is characterized by a relatively large amount of stored, or potential, energy (resulting from the compression of resilient element 192), the amount of stored energy in improved transducer assembly 200 is at or very near zero. The absence, or reduction, of stored energy in assembly 200 tends to make all components of assembly 200, including central hub 266 and electrode 230, remain substantially stationary and stable over time.

Figure 6A:
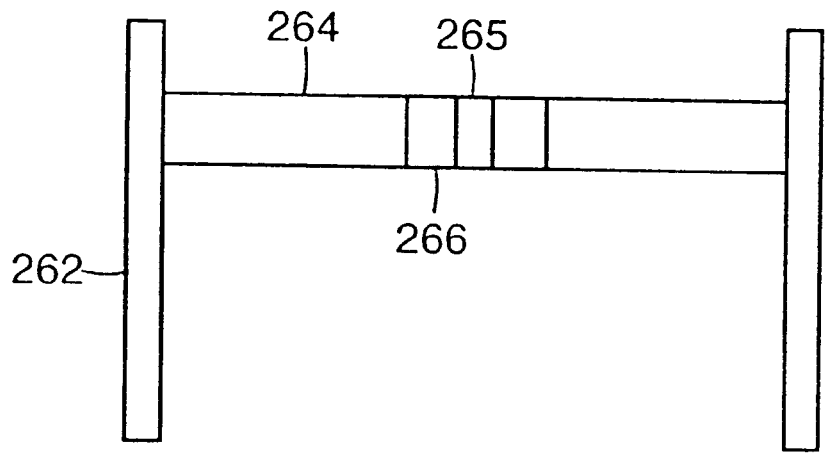
FIG. 6A shows a sectional side view of a P__r body, the spokes of which do not include reentrant grooves, in a nominal operating position.
Figure 6B:
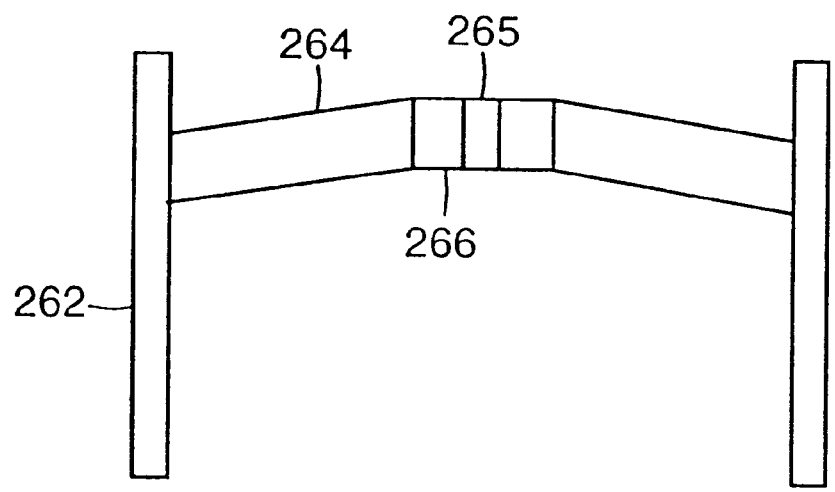
FIG. 6B shows a sectional side view of the P__r body shown in FIG. 6A after the application of heat.

Although central hub 266 tends to remain stationary during nominal operating conditions of assembly 200, in some embodiments hub 266 may experience some movement when assembly 200 experiences mechanical or thermal shock or stress. For example, heating or cooling assembly 200 causes thermal expansion or contraction of spokes 264. Such thermal expansion or contraction can place each of the spokes under compression or tension and the compressive or tensile forces on the spokes 264 may cause some displacement of central hub 266. FIG. 6A shows a sectional side view of a P__r body 260 showing casing 262, spokes 264, and central hub 266 all in a nominal operating position. FIG. 6B shows a sectional side view of the P__r body 260 shown in FIG. 6A after application of heat. The heat caused thermal expansion of spokes 264 which in turn caused an upward displacement (or bowing) of central hub 266.

To reduce such displacements caused by thermal or mechanical shock or stress, in the preferred embodiment of assembly 200, spokes 264 include reentrant grooves 269. In the embodiment illustrated in FIGS. 4A, 4B, and 4D, each of the spokes 264 include two reentrant grooves 269. In FIG. 3B, one of the spokes 264 is shown as including two reentrant grooves. For convenience of illustration, two of the spokes 264 in FIG. 3B are shown as not including any reentrant grooves, however, those skilled in the art will appreciate that each of these spokes preferably does include reentrant grooves. The reentrant grooves 269 permit the spokes 264 to maintain the stable position of central hub 266 even when the spokes 264 are under compression or tension. That is, the reentrant grooves 269 permit each of the spokes 264 to deform when the spokes 264 are exposed to compression or tension. Each spoke 264 is preferably provided with matching or complementary reentrant grooves 269 (i.e., the reentrant grooves in one spoke match the reentrant grooves in another spoke). Since all spokes 264 are provided with complementary reentrant grooves 269, the deformation in one spoke matches, or complements, the deformation experienced by the other spokes 264. The complementary deformation experienced by all of the spokes 264 causes the central hub 266 to remain stable in the nominal operating position even in the presence of thermal or mechanical shock or stress.

In the embodiment illustrated in FIGS. 4A, 4B, and 4D, each of the spokes 264 is provided with two complimentary rectangular reentrant grooves. Those skilled in the art will appreciate that in other embodiments other types of reentrant grooves may be used. For example, the shape of the reentrant grooves is not critical, and rather than being rectangular they could be characterized by other shapes and be for example semi-circular or triangular. Further, rather than two reentrant grooves per spoke, other numbers of grooves may be provided. In the preferred embodiment, each spoke includes at least two reentrant grooves. Those skilled in the art will appreciate that finite element analysis may be used to calculate other patterns of reentrant grooves that may be used with the invention.

Figure 7C:
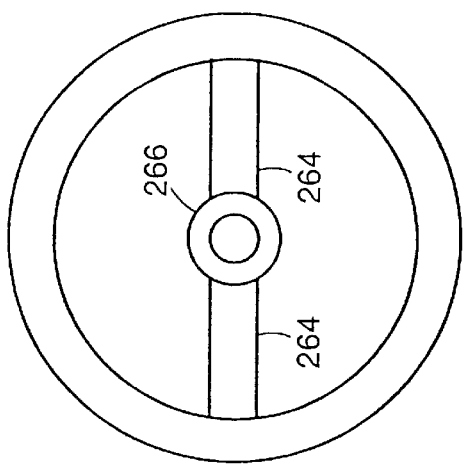
FIGS. 7A, 7B, 7C and 7D show top views of alternative embodiments of a P__r body constructed according to the invention.
Figure 7B:
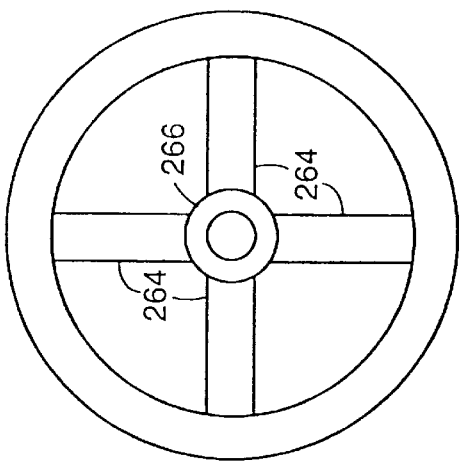
Figure 7A:
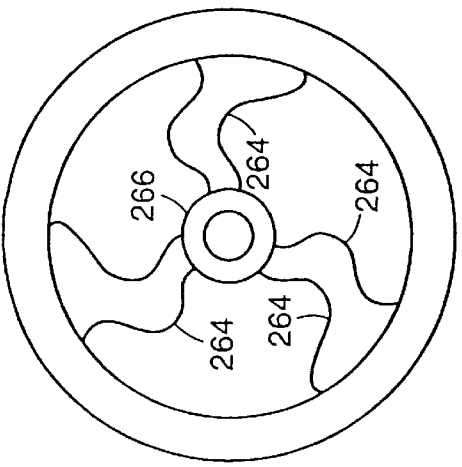
Figure 7D:
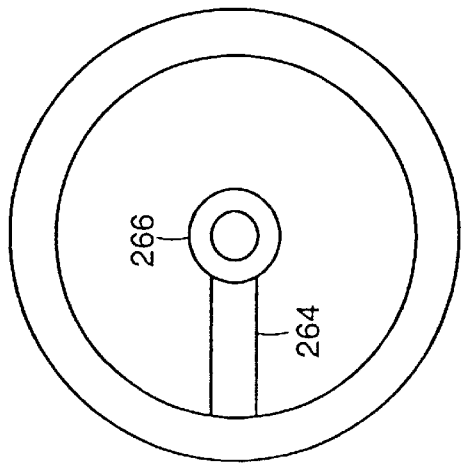

The preferred embodiment of P__r body 260 illustrated in FIGS. 4A–4D includes three spokes 264. Each of the spokes is straight and extends in a direction substantially perpendicular to the central axis 261 of P__r body 260. However, those skilled in the art will appreciate that other patterns of spokes may be used with the invention. FIGS. 7A, 7B, 7C, and 7D illustrate alternate configurations of the spokes 264. FIG. 7A shows a three-spoke configuration where each of the spokes is curved rather than straight. FIGS. 7B, 7C, and 7D show four, two, and one spoke configurations. P__r body 260 preferably includes two or more spokes, however, the one spoke embodiment (one example of which is illustrated in FIG. 7D) is also embraced within the invention. In all of the configurations illustrated in FIGS. 7A, 7B, and 7C, each of the spokes is preferably provided with reentrant grooves (not shown).

In addition to providing improved stability in the presence of thermal or mechanical shock or stress, the spoke design of P__r body 260 also provides improved stability in the presence of overpressure conditions. For example, referring to FIGS. 3A–3C, an overpressure condition can cause diaphragm 120 to contact and displace electrode 230. Spokes 264 flex upwards to permit such a displacement of electrode 230. However, when the overpressure condition dissipates, the spokes 264 tend to return to their original operating position and thereby return electrode 230 to its desired nominal operating position. With or without reentrant grooves, the spoke design of P__r body 260 provides an improved performance in the presence of overpressure conditions. Whereas the resilient element 192 of prior art assembly 100 could cause a reseating (or shifting) of electrode 130 following an overpressure condition, the spokes 264 of P__r body 260 tend to always return electrode 230 to its original desired nominal operating position following overpressure conditions.

P__r body 260 (including case 262, spokes 264, and central hub 266) is preferably of a monolithic (i.e., single piece) metallic construction. One preferred method of manufacturing P__r body is by extrusion. While monolithic construction is preferred, those skilled in the art will appreciate that P__r body 260 could alternatively be formed from separate parts.

In preferred embodiments, P__x cover 140, P__r body 260, P__r cover 170, hub 266, spokes 264, and spacer 206 are all fabricated from the same metal (e.g., Inconnel®, a nickel, iron, and chromium alloy). Insulative block 232 is preferably fabricated from alumina or Fosterite (i.e., Magnesium Silicate).

Since certain changes may be made in the above apparatus without departing from the scope of the invention herein involved, it is intended that all matter contained in the above description or shown in the accompanying drawing shall be interpreted in an illustrative and not a limiting sense. For example, while annular conductors have been illustrated, those skilled in the art will appreciate that various forms and numbers of conductors may be disposed on the electrodes to form capacitors with the diaphragm.

What is claimed is:

1. A pressure transducer assembly comprising:
   (A) a first body including a case, one or more spokes, and a hub, said case having an interior surface, each of said spokes extending from a first end to a second end, the first end of each spoke contacting said interior surface, the second end of each spoke contacting said hub;
   (B) a second body;
   (C) a diaphragm mounted between said first body and said second body, said first body and said diaphragm defining a first chamber, said second body and said diaphragm defining a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
   (D) an electrode disposed in said first chamber, said electrode being fixed to said hub, a capacitance between said electrode and said diaphragm being representative of a difference between said pressures in said first and second chambers.

2. An assembly according to claim 1, wherein said spokes define reentrant grooves.

3. An assembly according to claim 1, wherein said case, said spokes, and said hub are of a monolithic construction.

4. An assembly according to claim 1, wherein said electrode comprises an electrically insulative member and a conductor disposed on said electrically insulative member.

5. An assembly according to claim 1, further comprising a spacer disposed between said electrode and said hub.

6. A pressure transducer assembly comprising:
   (A) a first body including a case, one or more spokes, and a hub, said case having an interior surface, each of said spokes extending from a first end to a second end, the first end of each spoke contacting said interior surface, the second end of each spoke contacting said hub;
   (B) a second body;
   (C) a diaphragm mounted between said first body and said second body, said first body and said diaphragm defining a first chamber, said second body and said diaphragm defining a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
   (D) an insulator disposed in said first chamber;
   (E) a fastener fixing said insulator to said hub;
   (F) a conductor disposed on said insulator, said conductor and said diaphragm being characterized by a capacitance, said capacitance being representative of a difference between said pressures in said first and second chambers.

7. An assembly according to claim 6, wherein said fastener comprises a screw.

8. An assembly according to claim 6, wherein said fastener comprises a rivet.

9. An assembly according to claim 6, wherein said fastener comprises an adhesive.

10. An assembly according to claim 6, wherein said hub and said fastener are metallic.

11. An assembly according to claim 10, wherein said fastener is welded to said hub.

12. A pressure transducer assembly comprising:
    (A) a body having an interior surface and defining an interior cavity;
    (B) a diaphragm mounted in said body and dividing said interior cavity into a first chamber and a second chamber, a portion of said diaphragm flexing in a first direction in response to a pressure in said first chamber being higher than a pressure in said second chamber, said portion of said diaphragm flexing in a second direction opposite said first direction in response to said pressure in said second chamber being higher than said pressure in said first chamber;
    (C) a hub disposed in said first chamber;
    (D) one or more spokes disposed in said first chamber, each of said spokes extending from a first end to a second end, said first end of each of said spokes contacting said interior surface, said second end of each of said spokes contacting said hub;
    (D) an electrode disposed in said first chamber, said electrode being fixed to said hub, a capacitance between said electrode and said diaphragm being representative of a difference between said pressures in said first and second chambers.

* * * * *